(12) United States Patent
Zhou et al.

(10) Patent No.: US 12,245,317 B2
(45) Date of Patent: Mar. 4, 2025

(54) TERMINAL STATE PROCESSING METHOD, DEVICE AND MEDIUM

(71) Applicant: DATANG MOBILE COMMUNICATIONS EQUIPMENT CO., LTD., Beijing (CN)

(72) Inventors: Rui Zhou, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 357 days.

(21) Appl. No.: 17/789,097

(22) PCT Filed: Nov. 30, 2020

(86) PCT No.: PCT/CN2020/132648
§ 371 (c)(1),
(2) Date: Jun. 24, 2022

(87) PCT Pub. No.: WO2021/147513
PCT Pub. Date: Jul. 29, 2021

(65) Prior Publication Data
US 2023/0034791 A1 Feb. 2, 2023

(30) Foreign Application Priority Data
Jan. 21, 2020 (CN) .......................... 202010071855.9

(51) Int. Cl.
*H04W 28/02* (2009.01)
*H04W 72/30* (2023.01)
*H04W 76/27* (2018.01)

(52) U.S. Cl.
CPC ....... *H04W 76/27* (2018.02); *H04W 28/0289* (2013.01); *H04W 72/30* (2023.01)

(58) Field of Classification Search
CPC .. H04W 76/27; H04W 72/30; H04W 28/0289
(Continued)

(56) References Cited

U.S. PATENT DOCUMENTS

| | | | |
|---|---|---|---|
| 2013/0114405 A1* | 5/2013 | Kim | H04W 48/02 370/312 |
| 2018/0035265 A1* | 2/2018 | Kim | H04W 48/12 |

(Continued)

FOREIGN PATENT DOCUMENTS

| | | |
|---|---|---|
| CN | 103313197 A | 9/2013 |
| CN | 103763748 A | 4/2014 |

(Continued)

OTHER PUBLICATIONS

International Search Report for PCT/CN2020/132648 issued on Feb. 25, 2021, and its English translation provided by WIPO.

(Continued)

*Primary Examiner* — Christopher R Crompton
(74) *Attorney, Agent, or Firm* — Ladas & Parry, LLP

(57) ABSTRACT

This disclosure provides a terminal state processing method, a device and a medium. The method includes: in a case that a network is overloaded due to an excessive quantity of terminals receiving an MBMS service in an RRC_CONNECTED state, indicating, by a network side device, that a terminal receiving the MBMS service is to enter a specified RRC state, and/or indicating, by the network side device, a time duration for a terminal to receive the MBMS service in the specified RRC state. The terminal enters the specified RRC state in accordance with the indication, and/or receives the MBMS service in the specified RRC state during the indicated time duration.

16 Claims, 9 Drawing Sheets

```
RRCRelease-IEs ::=                    SEQUENCE {
    redirectedCarrierInfo                 RedirectedCarrierInfo                      OPTIONAL,
-- Need N
    cellReselectionPriorities             CellReselectionPriorities                  OPTIONAL,
-- Need R
    suspendConfig                         SuspendConfig                              OPTIONAL,
-- Need R
    deprioritisationReq                   SEQUENCE {
        deprioritisationType                  ENUMERATED {frequency, nr},
        deprioritisationTimer                 ENUMERATED {min5, min10, min15, min30}
    }                                                                                OPTIONAL,
-- Need N
    lateNonCriticalExtension              OCTET STRING                               OPTIONAL,
    nonCriticalExtension                  RRCRelease-v1540-IEs                       OPTIONAL
}
```

(58) Field of Classification Search
USPC .......................................................... 370/312
See application file for complete search history.

(56) References Cited

U.S. PATENT DOCUMENTS

| 2018/0098311 A1* | 4/2018 | Hong .................... H04W 76/10 |
| 2020/0374968 A1 | 11/2020 | Sun et al. |
| 2021/0120624 A1 | 4/2021 | Ying et al. |

FOREIGN PATENT DOCUMENTS

| CN | 108347743 A | 7/2018 |
| CN | 110149728 A | 8/2019 |
| CN | 110677870 A | 1/2020 |
| EP | 3349487 A1 | 7/2018 |
| WO | 2020007232 A1 | 1/2020 |

OTHER PUBLICATIONS

Written Opinion for PCT/CN2020/132648 issued on Feb. 25, 2021, and its English translation provided by WIPO.

International Preliminary Report for PCT/CN2020/132648 issued on Jul. 26, 2022 and its English translation provided by WIPO.

"Correction on cell (re)selection in RRC_Inactive," 3GPP TSG-RAN WG2 Meeting #103, R2-1811863, Gothenburg, Sweden, Aug. 20-24, 2018, Source to WG: Google, Source to TSG: R2, all pages.

First Office Action and search report for Chinese Patent Application 202010071855.9 issued on May 10, 2022, and its English translation provided by the Chinese Patent Office.

"Discussion on PLMN based overload," 3GPP TSG RAN WG3 #87, R3-150139, Athens, Greece, Feb. 9-13, 2015, Source: Samesung, Agenda item: 13.1, all pages.

Extended European Search Report for the corresponding European Patent Application 20914830.3 issued on May 15, 2023, 8 pages.

* cited by examiner

```
RRCRelease-IEs ::=              SEQUENCE {
    redirectedCarrierInfo           RedirectedCarrierInfo                           OPTIONAL,
-- Need N
    cellReselectionPriorities       CellReselectionPriorities                       OPTIONAL,
-- Need R
    suspendConfig                   SuspendConfig                                   OPTIONAL,
-- Need R
    deprioritisationReq             SEQUENCE {
        deprioritisationType            ENUMERATED {frequency, nr},
        deprioritisationTimer           ENUMERATED {min5, min10, min15, min30}
    }                                                                               OPTIONAL,
-- Need N
    lateNonCriticalExtension        OCTET STRING                                    OPTIONAL,
    nonCriticalExtension            RRCRelease-v1540-IEs                            OPTIONAL
}
```

Fig. 3

```
RRCRelease-IEs ::=            SEQUENCE {
    redirectedCarrierInfo         RedirectedCarrierInfo          OPTIONAL,
-- Need N
    cellReselectionPriorities     CellReselectionPriorities      OPTIONAL,
-- Need R
    suspendConfig                 SuspendConfig                  OPTIONAL,
-- Need R
    LoadBalance_MBMS_Indication
    MBMS_Backoff_Timer
```

Fig. 7

```
RRCRelease-IEs ::=           SEQUENCE {
    redirectedCarrierInfo        RedirectedCarrierInfo        OPTIONAL,
--  Need N
    cellReselectionPriorities    CellReselectionPriorities    OPTIONAL,
--  Need R
    suspendConfig                SuspendConfig                OPTIONAL,
--  Need R
    MBMS_Backoff_Timer
```

Fig. 10

TERMINAL STATE PROCESSING METHOD, DEVICE AND MEDIUM

CROSS-REFERENCE TO RELATED APPLICATIONS

This application is a U.S. national phase application of a PCT Application No. PCT/CN2020/132648 filed on Nov. 30, 2020, which claims a priority to the Chinese patent application No. 202010071855.9 filed in China on Jan. 21, 2020, the disclosures of which are incorporated herein by reference in their entireties.

TECHNICAL FIELD

The present disclosure relates to the field of wireless communication technology, in particular to a terminal state processing method, a device and a medium.

BACKGROUND

Multimedia broadcast/multicast service (MBMS) technology in the $5^{th}$-Generation (5G) Release 17 (R17) will support reception of MBMS services and uplink feedback on the reception status by a terminal in a radio resource control connected (RRC_CONNECTED) state.

The related art suffers from a disadvantage that a network may be overloaded when there are an excessive quantity of user equipment (UEs) receiving MBMSs in the RRC_CONNECTED state in a cell.

SUMMARY

The present disclosure provides a terminal state processing method, a device and a medium, so as to solve the problem that the network is overloaded due to excessive quantity of UEs receiving the MBMS service in the RRC_CONNECTED state.

The present disclosure provides in an embodiment a terminal state processing method, including: indicating, by a network side device, that a terminal receiving the MBMS service is to enter a specified RRC state in the case that a network is overloaded due to an excessive quantity of terminals receiving the MBMS service in an RRC_CONNECTED state; and/or indicating, by the network side device, a time duration for a terminal to receive the MBMS service in the specified RRC state in the case that the network is overloaded due to the excessive quantity of terminals receiving the MBMS service in the RRC_CONNECTED state.

In an implementation, the network side device merely indicates that the terminal receiving the MBMS service is to enter the specified RRC state, to cause the terminal to enter the specified RRC state; or the network side device indicates that the terminal receiving the MBMS service is to enter the specified RRC state and indicates the time duration for the terminal to receive the MBMS service in the specified RRC state, to cause the terminal to enter the specified RRC state and receive the MBMS service in the specified RRC state during the indicated time duration; or the network side device merely indicates the time duration for the terminal to receive the MBMS service in the specified RRC state, to cause the terminal to enter the specified RRC state and receive the MBMS service in the specified RRC state during the indicated time duration.

In an implementation, the network side provides the indication through an RRCRelease message.

In an implementation, the network side provides the indication by adding an information element to the RRCRelease message.

The present disclosure provides in an embodiment a terminal state processing method, including: receiving, by a terminal receiving an MBMS service, an indication sent by a network side device that the terminal is to enter a specified RRC state, and/or receiving, by the terminal receiving the MBMS service, an indication, sent by the network side device, of a time duration for the terminal to receive the MBMS service in the specified RRC state, wherein the indications are transmitted by the network side device in a case that a network is overloaded due to an excessive quantity of terminals receiving the MBMS service in an RRC_CONNECTED state; and entering, by the terminal, the specified RRC state in accordance with the indication, and/or receiving, by the terminal, the MBMS service in the specified RRC state during the indicated time duration.

In an implementation, the terminal merely enters the specified RRC state, in a case that only the indication that the terminal is to enter the specified RRC state is received by the terminal; or the terminal enters the specified RRC state and receives the MBMS service in the specified RRC state during the indicated time duration, in a case that the indication that the terminal is to enter the specified RRC state and the indication of the time duration for the terminal to receive the MBMS service in the specified RRC state are received by the terminal; or the terminal enters the specified RRC state and receives the MBMS service in the specified RRC state during the indicated time duration, in a case that only the indication of the time duration for the terminal to receive the MBMS service in the specified RRC state is received by the terminal.

In an implementation, the method further includes: stopping timing, by the terminal, in a case that a time duration during which the terminal enters the specified RRC state is within the indicated time duration when the MBMS service ends; or triggering, by the terminal, a process to enter the RRC_CONNECTED state in a case that the MBMS service does not end when the time duration during which the terminal enters the specified RRC state reaches the indicated time duration.

In an implementation, indication received by the terminal is indicated by the network side device through an RRCRelease message.

In an implementation, the indication received by the terminal is indicated by the network side device by adding an information element to the RRCRelease message.

The present disclosure provides in an embodiment a base station, including: a processor, configured to read a program in a memory and execute the following process: indicating that a terminal receiving the MBMS service is to enter a specified RRC state in the case that a network is overloaded due to an excessive quantity of terminals receiving the MBMS service in an RRC_CONNECTED state; and/or indicating a time duration for a terminal to receive the MBMS service in the specified RRC state in the case that the network is overloaded due to the excessive quantity of terminals receiving the MBMS service in the RRC_CONNECTED state; and a transceiver, configured to receive and transmit data under control of the processor.

In an implementation, the base station merely indicates that the terminal receiving the MBMS service is to enter the specified RRC state, to cause the terminal to enter the specified RRC state; or the base station indicates that the terminal receiving the MBMS service is to enter the specified RRC state and indicates the time duration for the terminal to receive the MBMS service in the specified RRC state, to cause the terminal to enter the specified RRC state and receive the MBMS service in the specified RRC state during the indicated time duration; or the base station merely indicates the time duration for the terminal to receive the MBMS service in the specified RRC state, to cause the terminal to enter the specified RRC state and receive the MBMS service in the specified RRC state during the indicated time duration.

In an implementation, the base station provides the indication through an RRCRelease message.

In an implementation, the base station provides the indication by adding an information element to the RRCRelease message.

The present disclosure provides in an embodiment a terminal, including: a processor, configured to read a program in a memory and execute the following process: receiving, by a terminal receiving an MBMS service, an indication sent by a network side device that the terminal is to enter a specified RRC state, and/or receiving, by the terminal receiving the MBMS service, an indication, sent by the network side device, of a time duration for the terminal to receive the MBMS service in the specified RRC state, wherein the indications are transmitted by the network side device in a case that a network is overloaded due to an excessive quantity of terminals receiving the MBMS service in an RRC_CONNECTED state; and entering the specified RRC state in accordance with the indication, and/or receiving the MBMS service in the specified RRC state during the indicated time duration; and a transceiver, configured to receive and transmit data under control of the processor.

In an implementation, the terminal merely enters the specified RRC state, in a case that only the indication that the terminal is to enter the specified RRC state is received by the terminal; or the terminal enters the specified RRC state and receives the MBMS service in the specified RRC state during the indicated time duration, in a case that the indication that the terminal is to enter the specified RRC state and the indication of the time duration for the terminal to receive the MBMS service in the specified RRC state are received by the terminal; or the terminal enters the specified RRC state and receives the MBMS service in the specified RRC state during the indicated time duration, in a case that only the indication of the time duration for the terminal to receive the MBMS service in the specified RRC state is received by the terminal.

In an implementation, the terminal further includes: stopping timing, by the terminal, in a case that a time duration during which the terminal enters the specified RRC state is within the indicated time duration when the MBMS service ends; or triggering, by the terminal, a process to enter the RRC_CONNECTED state, in a case that the MBMS service does not end when the time duration during which the terminal enters the specified RRC state reaches the indicated time duration.

In an implementation, the indication received by the terminal is indicated by the network side device through an RRCRelease message.

In an implementation, the indication received by the terminal is indicated by the network side device by adding an information element to the RRCRelease message.

The present disclosure provides in an embodiment a terminal state processing apparatus, including: an indication module, configured to indicate that a terminal receiving the MBMS service is to enter a specified RRC state in the case that a network is overloaded due to an excessive quantity of terminals receiving the MBMS service in an RRC_CON-NECTED state; and/or indicate a time duration for a terminal to receive the MBMS service in the specified RRC state in the case that the network is overloaded due to the excessive quantity of terminals receiving the MBMS service in the RRC_CONNECTED state.

The present disclosure provides in an embodiment a terminal state processing apparatus, including: a receiving module, configured to receive an indication sent by a network side device that a terminal receiving an MBMS service is to enter a specified RRC state, and/or receive an indication, sent by the network side device, of a time duration for the terminal to receive the MBMS service in the specified RRC state, wherein the indications are transmitted by the network side device in a case that a network is overloaded due to an excessive quantity of terminals receiving the MBMS service in an RRC_CONNECTED state; and a processing module, configured to enter the specified RRC state in accordance with the indication, and/or receive the MBMS service in the specified RRC state during the indicated time duration.

The present disclosure provides in an embodiment a computer-readable storage medium storing therein a computer program, the computer program is configured to be executed by a processor, to implement the above-mentioned terminal state processing methods.

The present disclosure has the following beneficial effects.

According to the embodiments of the present disclosure, in the case that a network is overloaded due to an excessive quantity of terminals receiving the MBMS service in an RRC_CONNECTED state, the network side device may indicate that the terminal is to enter a specified RRC state, and/or indicate the time duration for the terminal to receive the MBMS service in the specified RRC state, so that the network side device may flexibly control the UE receiving the MBMS service to temporarily switch to the specified RRC state, and return to the RRC_CONNECTED state at a specific time in accordance with the configuration of the network. Therefore, when the network side is overloaded, the network side device may control the UE receiving the MBMS service in the RRC_CONNECTED state to temporarily receive the MBMS service in the specified RRC state, so as to reduce the quantity of MBMS UEs in the connected state when the network is overloaded, thereby to realize the control of load balance.

BRIEF DESCRIPTION OF THE DRAWINGS

The drawings, which are set forth herein to provide further understanding of the present disclosure, are incorporated in and constitute a part of the present disclosure, and the illustrative embodiments of the present disclosure and the description thereof are for the purpose of explanation and shall not be construed as limiting the present disclosure. In these drawings.

FIG. 3 is a schematic structural view showing an RRCRelease message according to an embodiment of the present disclosure;

FIG. 7 is a schematic structural view showing the RRCRelease message in the second Mode according to an embodiment of the present disclosure;

FIG. 10 is a schematic structural view showing the RRCRelease message in the third Mode according to an embodiment of the present disclosure;

DETAILED DESCRIPTION

In the process of research, it is observed that: in the related art, a network may be overloaded due to the excessive quantity of user equipment (UEs) receiving the MBMS service in a radio resource control (RRC)_CONNECTED state in a cell.

A feasible load balance scheme provided in the embodiments of the present disclosure is that when the network is overloaded, a network side device temporarily controls some UEs to assume other states, such as RRC idle (RRC_IDLE) state or RRC inactive (RRC_INACTIVE) state.

In the related art, the network may control the UEs to assume other RRC states through an RRCRelease message. However, in the related art, the RRCRelease message may not instructs the UE receiving the MBMS to temporarily switch to the RRC_IDLE state or the RRC_INACTIVE state to receive the MBMS service.

That is, when the network side is overloaded, the network side may not control the UE receiving the MBMS service in the RRC_CONNECTED state to receive the MBMS in a specified state.

Based on this, the present disclosure provides in an embodiment a load balance scheme, to be specific, a terminal state processing method. According to embodiments of the present disclosure, the UE receiving the MBMS service in the RRC_CONNECTED state may be temporarily controlled to assume other states (the RRC_IDLE state or the RRC_INACTIVE state) to continue receiving the MBMS service, so as to solve the problem that the network is overloaded due to the excessive quantity of terminals receiving the MBMS service in the RRC_CONNECTED state.

Specific implementations of the present disclosure will be described hereinafter with reference to the drawings.

The description will be given from perspectives of implementation on the terminal side and implementation on the network side, respectively, and then an example of the cooperative implementation of the terminal and the network side will be given to better understand the implementation of the scheme given in embodiments of the present disclosure.

This manner of description does not mean that the terminal side implementation and the network side implementation must be implemented together or separately. In fact, when the terminal side implementation and the network side implementation are implemented separately, they also solve the problems of the terminal side and the network side respectively, and when they are used together, a better technical effect will be obtained.

Figure 1:
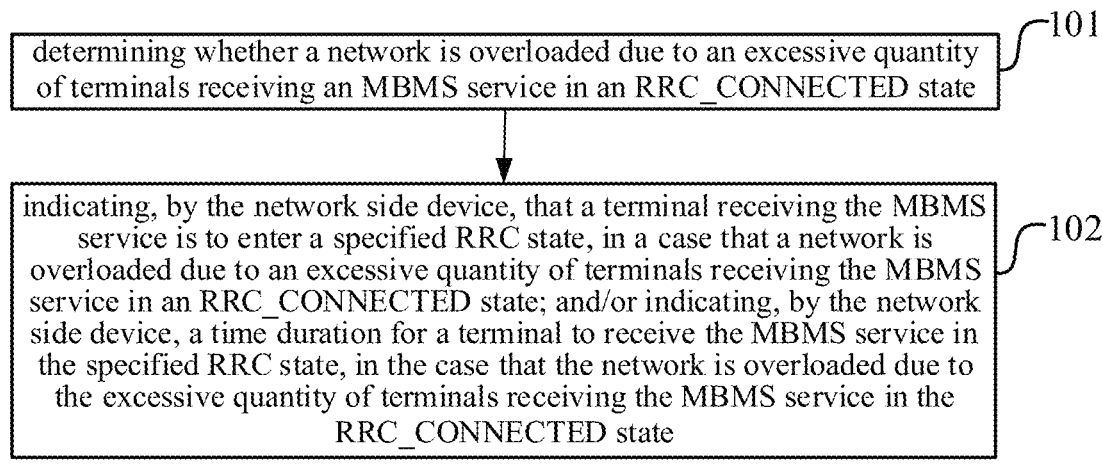
FIG. 1 is a flow chart of a terminal state processing method for a network side according to an embodiment of the present disclosure.

FIG. 1 shows a flow chart of an implementation process of a terminal state processing method for a network side device. As shown in FIG. 1, the method includes: Step 101, determining whether a network is overloaded due to an excessive quantity of terminals receiving multimedia broadcast/multicast service (MBMS) service in the RRC_CONNECTED state; and Step 102, indicating, by the network side device, that a terminal receiving a multimedia broadcast/multicast service (MBMS) service is to enter a specified radio resource control (RRC) state, in a case that a network is overloaded due to an excessive quantity of terminals receiving the MBMS service in an RRC_CONNECTED state; and/or indicating, by the network side device, a time duration for a terminal to receive the MBMS service in the specified RRC state, in the case that the network is overloaded due to the excessive quantity of terminals receiving the MBMS service in the RRC_CONNECTED state.

Figure 2:
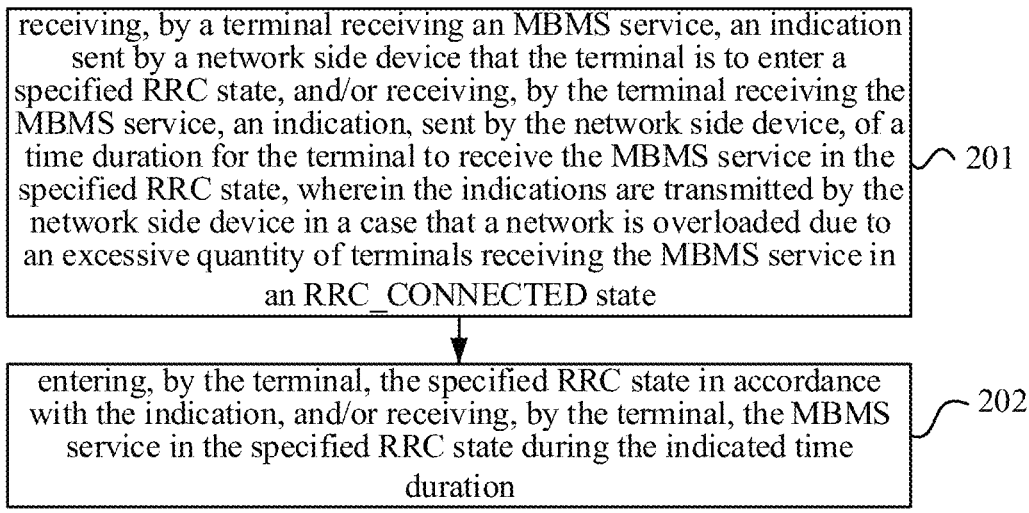
FIG. 2 is a flow chart of a terminal state processing method for a terminal side according to an embodiment of the present disclosure.

FIG. 2 shows a flow chart of an implementation process of a terminal state processing method for a terminal side. As shown in FIG. 2, the method includes: Step 201, receiving, by a terminal receiving an MBMS service, an indication sent by a network side device that the terminal is to enter a specified RRC state, and/or receiving, by the terminal receiving the MBMS service, an indication, sent by the network side device, of a time duration for the terminal to receive the MBMS service in the specified RRC state, wherein the indications are transmitted by the network side device in a case that a network is overloaded due to an excessive quantity of terminals receiving the MBMS service in an RRC_CONNECTED state; and Step 202, entering, by the terminal, the specified RRC state in accordance with the indication, and/or receiving, by the terminal, the MBMS service in the specified RRC state during the indicated time duration.

To be specific, in the case that the network is overloaded due to an excessive quantity of terminals receiving the MBMS service in the RRC_CONNECTED state, the network side indicates that the UE receiving the MBMS is to switch to the specified RRC state (the RRC_IDLE state or the RRC_INACTIVE state) so as to reduce the quantity of MBMS UEs in the connected state; and/or indicates a time duration for the UE to receive the MBMS service in the specified state.

Subsequent to receiving the above indication, the UEs may switch to the specified state to continue receiving the MBMS service, and may re-enter the RRC_CONNECTED state to receive the MBMS after the time duration indicated by the network side expires.

In an implementation, for the network side: the network side device provides the indication through an RRCRelease message.

In a specific implementation, the network side device provides the indication by adding an information element to the RRCRelease message.

To be specific, the network side device indicates whether the terminal is to enter the specified RRC state by whether setting a LoadBalance_MBMS_Indication field in the added information element to be true; and/or the network side device indicates, by means of an MBMS_Backoff_Timer field in the added information element, the time duration for the terminal to receive MBMS service in the specified RRC state.

Through introducing the function of MBMS service load balancing in the RRC_CONNECTED state, some UEs may be instructed to assume other specified states. To be specific, an indication that the UE receiving the MBMS service is to switch to the specified RRC state (the RRC_IDLE state or the RRC_INACTIVE state) is added in the RRCRelease message. At the same time, a time duration for the UE to receive the MBMS in the specified RRC state may be indicated.

Correspondingly, for the terminal side: the indication received by the terminal is indicated by the network side device through an RRCRelease message.

In a specific implementation, the indication received by the terminal is indicated by the network side device by adding an information element to the RRCRelease message.

To be specific, the indication received by the terminal includes: the network side device indicates whether the terminal is to enter the specified RRC state by whether setting a LoadBalance_MBMS_Indication field in the added information element to be true; and/or the network side device indicates, by means of an MBMS_Backoff_Timer field in the added information element, the time duration for the terminal to receive MBMS service in the specified RRC state.

Through introducing the function of processing the MBMS load balance indication and/or load balance timer in the RRCRelease message, the UE may switch to the specified state to continue receiving the MBMS service, and may return to the RRC_CONNECTED state to continue receiving the MBMS service after the load balance timer configured by the network expires.

In order to add the above indication in the RRCRelease message in the related art, there is a need to add related information element, which is represented by the MBMS load balance indication and/or the MBMS load balance timer in the embodiments of the present disclosure. The MBMS load balance indication is specifically: LoadBalance_MBMS_Indication (MBMS load balance indication), and the MBMS load balance timer is specifically: MBMS_Backoff_Timer (MBMS backoff timer), which will be described hereinafter in conjunction with specific embodiments. It should be appreciated that, specific information element names mentioned in the embodiments of the present disclosure are merely for convenience of description and illustration, and do not mean that merely the names may be used, which is easily understood by a person skilled in the art.

In an implementation, the network side device merely indicates that the terminal receiving the MBMS service is to enter the specified RRC state, to cause the terminal to enter the specified RRC state; or the network side device indicates that the terminal receiving the MBMS service is to enter the specified RRC state and indicates the time duration for the terminal to receive the MBMS service in the specified RRC state, to cause the terminal to enter the specified RRC state and receive the MBMS service in the specified RRC state during the indicated time duration; or the network side device merely indicates the time duration for the terminal to receive the MBMS service in the specified RRC state, to cause the terminal to enter the specified RRC state and receive the MBMS service in the specified RRC state during the indicated time duration.

For the terminal side, the terminal merely enters the specified RRC state, in a case that only the indication that the terminal is to enter the specified RRC state is received by the terminal; or the terminal enters the specified RRC state and receives the MBMS service in the specified RRC state during the indicated time duration, in a case that the indication that the terminal is to enter the specified RRC state and the indication of the time duration for the terminal to receive the MBMS service in the specified RRC state are received by the terminal; or the terminal enters the specified RRC state and receives the MBMS service in the specified RRC state during the indicated time duration, in a case that only the indication of the time duration for the terminal to receive the MBMS service in the specified RRC state is received by the terminal.

Three implementation modes will be described hereinafter exemplarily.

Before the description, the RRCRelease message is described firstly.

FIG. 3 is a schematic structural view showing an RRCRelease message, and FIG. 3 shows the RRCRelease message structure in the related art. In the following embodiments, the added information elements will be described in conjunction with the RRCRelease message structure.

First Mode

The terminal merely enters the specified RRC state in the case that only the indication that the terminal is to enter the specified RRC state is received by the terminal.

Figure 4:
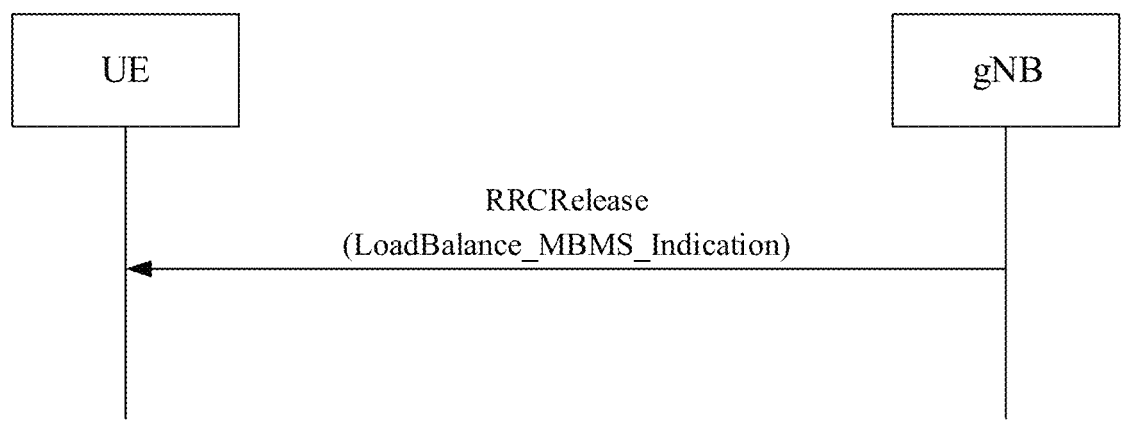
FIG. 4 is a schematic view showing transmitting the RRCRelease message in a first Mode according to an embodiment of the present disclosure.

FIG. 4 is a schematic view showing transmitting the RRCRelease message in the first mode. As shown in FIG. 4, an information element "MBMS load balance indication (LoadBalance_MBMS_Indication in this example)" is added in the RRCRelease message, to explicitly indicate that the network side performs MBMS load balance on the UEs through RRC connection release.

Based on the above configuration scheme, a specific embodiment is as follows:

First Embodiment

Figure 5:
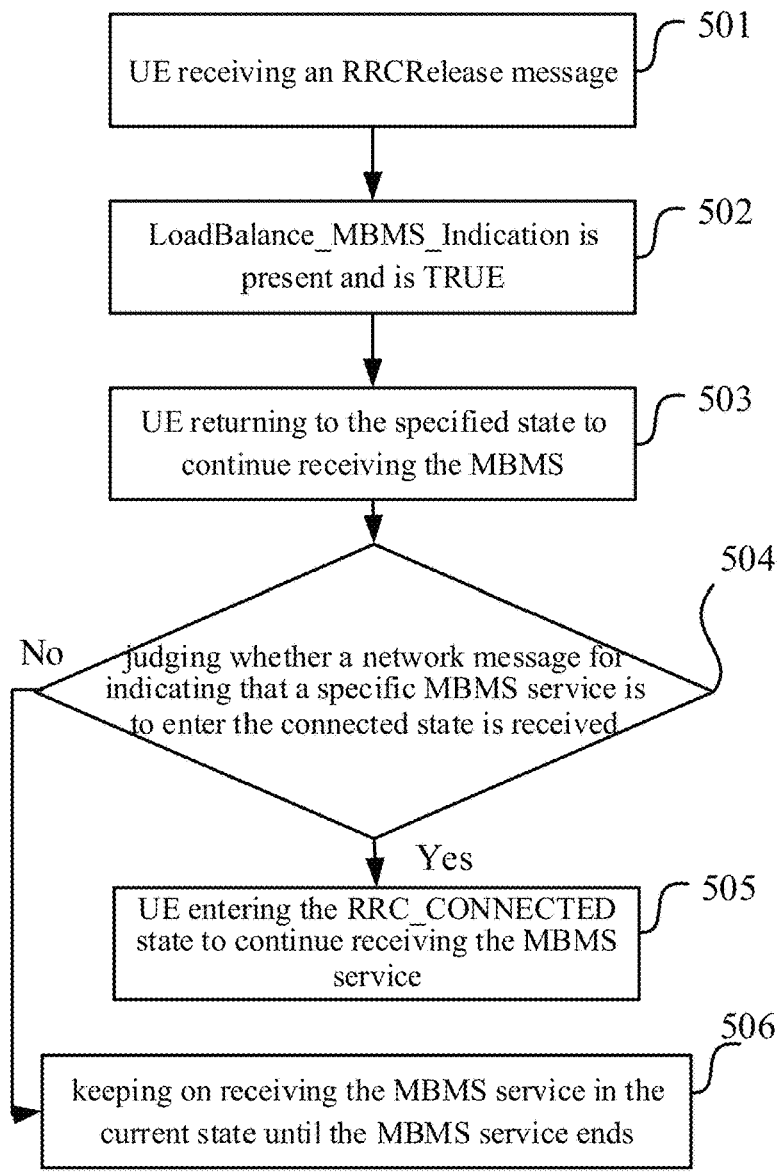
FIG. 5 is a flow chart of an implementation process of a terminal state processing method according to a first embodiment of the present disclosure.

FIG. 5 shows a flow chart of an implementation process of the terminal state processing method in the first embodiment. The network configures the information element MBMS load balance indication (e.g., LoadBalance_MBMS_Indication) in the RRCRelease message to perform the load balance on the UEs. As shown in FIG. 5, when the description is mainly from the terminal side, the method includes steps 501-506.

Step 501: the UE receiving an RRCRelease message.

In an implementation, the network side device already included the LoadBalance_MBMS_Indication in the RRCRelease message.

Step 502: the UE checking that the information element LoadBalance_MBMS_Indication is present and is TRUE.

Step 503: the UE returning to the specified state to continue receiving the corresponding MBMS service.

Step 504: the UE judging whether a network message for indicating that a specific MBMS service is to enter the connected state is received; if yes, Step 505 is performed, otherwise, Step 506 is performed.

When the UE continues receiving the MBMS service in the specified state, the network may indicate again, based on the load condition, that the UE receiving the specific MBMS service (e.g., indicated by temporary mobile group identity (TMGI) or session identification (session id)) is to enter the RRC_CONNECTED state for reception.

Step 505: subsequent to receiving the above indication from the network, the UE triggering a process to enter the RRC_CONNECTED state to continue receiving the corresponding MBMS service.

Step 506: the UE keeping on receiving the MBMS service in the current state until the MBMS service ends.

Second Mode

The terminal enters the specified RRC state and receives the MBMS service in the specified RRC state during the indicated time duration, in a case that the indication that the terminal is to enter the specified RRC state and the indication of the time duration for the terminal to receive the MBMS service in the specified RRC state are received by the terminal.

Figure 6:
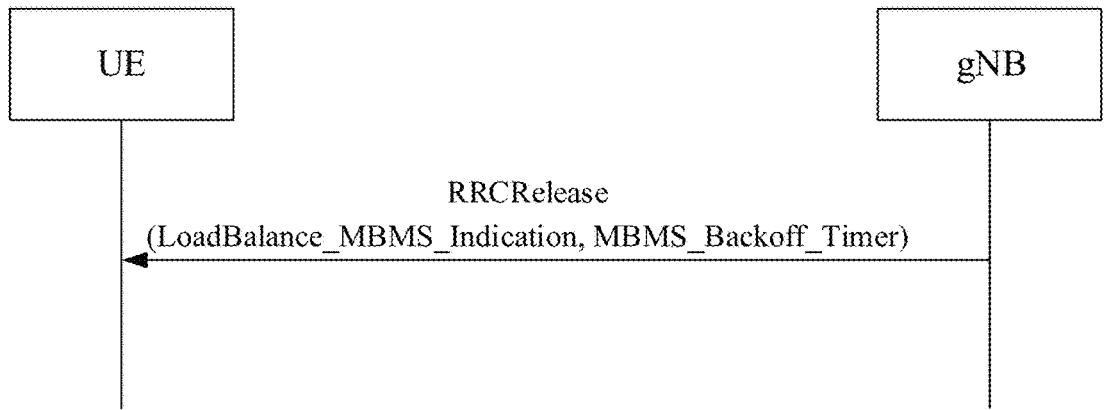
FIG. 6 is a schematic view showing transmitting the RRCRelease message in a second Mode according to an embodiment of the present disclosure.

FIG. 6 is a schematic view showing transmitting the RRCRelease message in the second mode. As shown in FIG. 6, an information element "MBMS load balance indication (LoadBalance_MBMS_Indication in this example)" is added in the RRCRelease message, to explicitly indicate that the network side performs MBMS load balance on the UEs through RRC connection release.

At the same time, an information element "load balance timer (MBMS_Backoff_Timer in this example)" is added, to indicate the time duration during which the UE should remain in the specified state (RRC_IDLE or RRC_INACTIVE).

FIG. 7 is a schematic structural view showing an RRCRelease message structure in the second mode, and FIG. 7 shows the specific configuration of the RRCRelease message in the second mode. Compared with the message structure in FIG. 3, the added information element is shown in bold.

Based on the above configuration scheme, a specific embodiment is as follows:

Second Embodiment

Figure 8:
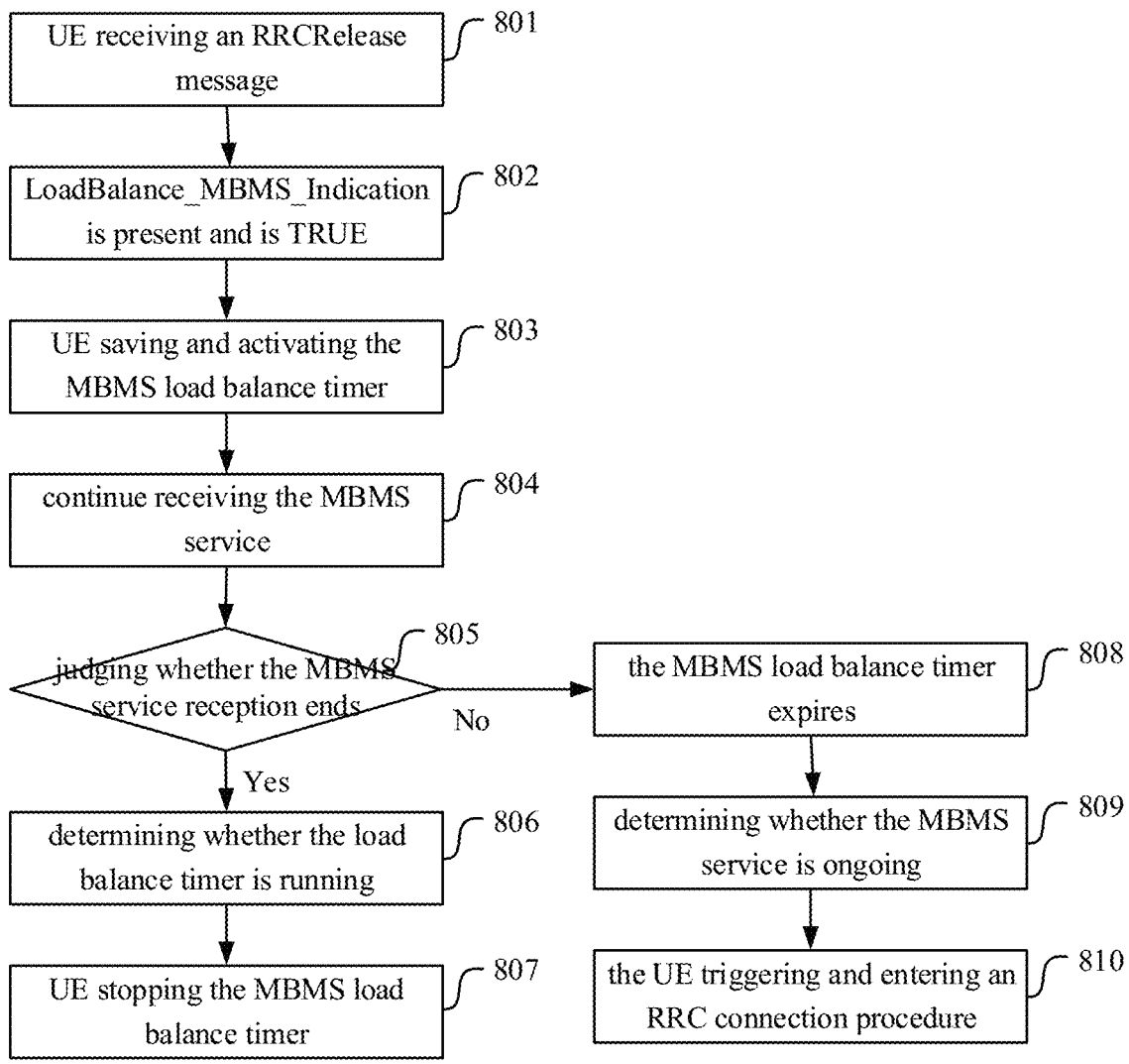
FIG. 8 is a flow chart of an implementation process of a terminal state processing method according to a second embodiment of the present disclosure.

FIG. 8 shows a flow chart of an implementation process of the terminal state processing method in the second embodiment. The network configures the information element MBMS load balance indication (e.g., LoadBalance_MBMS_Indication) and the information element MBMS load balance timer (e.g., MBMS_Backoff_Timer) in the RRCRelease message to perform the load balance on the UEs. As shown in FIG. 8, when the description is mainly from the terminal side, the method includes the following steps 801 to 810.

Step 801: the UE receiving an RRCRelease message.

In an implementation, the network side device already included the LoadBalance_MBMS_Indication and the MBMS_Backoff_Timer in the RRCRelease message.

Step 802: the UE checking that the information element LoadBalance_MBMS_Indication is present and is TRUE.

To be specific, the UE checks the information element LoadBalance_MBMS_Indication, and if the LoadBalance_MBMS_Indication is TRUE, the MBMS_Backoff_Timer is saved to control the time duration of MBMS load balance.

Step 803: the UE saving and activating the MBMS load balance timer.

Step 804: the UE returning to the specified state to continue receiving the corresponding MBMS service.

To be specific, the UE returns to the specified state to continue receiving the corresponding MBMS service and activates the MBMS load balance timer, and the duration of the timer is set to be the MBMS_Backoff_Timer.

Step 805: judging whether the MBMS service reception ends, if yes, Step 806 is performed, otherwise, Step 808 is performed.

Step 806: determining whether the load balance timer is running.

Step 807: the UE stopping the MBMS load balance timer.

Step 808: determining whether the MBMS load balance timer expires.

Step 809: determining whether the MBMS service reception is ongoing.

Step 810: the UE triggering and entering an RRC connection procedure.

To be specific, if the UE ends the MBMS service while the MBMS load balance timer is still running, the MBMS load balance timer is stopped; and if the MBMS timer expires and the MBMS is still ongoing, the UE triggering a process to enter the RRC_CONNECTED state.

Third Mode

The terminal enters the specified RRC state and receives the MBMS service in the specified RRC state during the indicated time duration in a case that only the indication of the time duration for the terminal to receive the MBMS service in the specified RRC state is received by the terminal.

Figure 9:
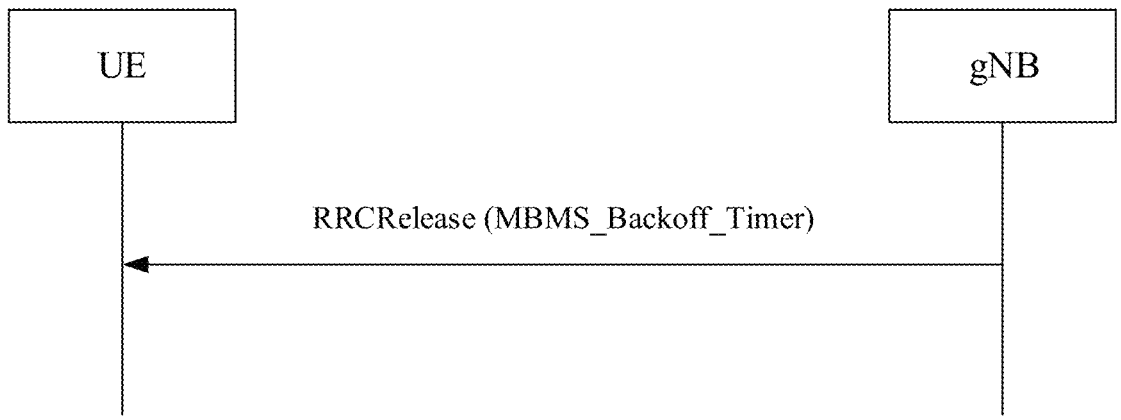
FIG. 9 is a schematic view showing transmitting the RRCRelease message in a third Mode according to an embodiment of the present disclosure.

FIG. 9 is a schematic view showing transmitting the RRCRelease message in the third mode. As shown in FIG. 9, merely an information element load balance timer (MBMS_Backoff_Timer in this example) is configured in this mode, and when the information element MBMS_Backoff_Timer appears, it implicitly indicates that the network performs MBMS load balance on the UEs through RRC connection release.

FIG. 10 is a schematic structural view showing the RRCRelease message in the third mode, and FIG. 10 shows the specific configuration of the RRCRelease message in the third mode. Compared with the message structure in FIG. 3, the added information element is shown in bold.

Based on the above configuration scheme, a specific embodiment is as follows:

Third Embodiment

Figure 11:
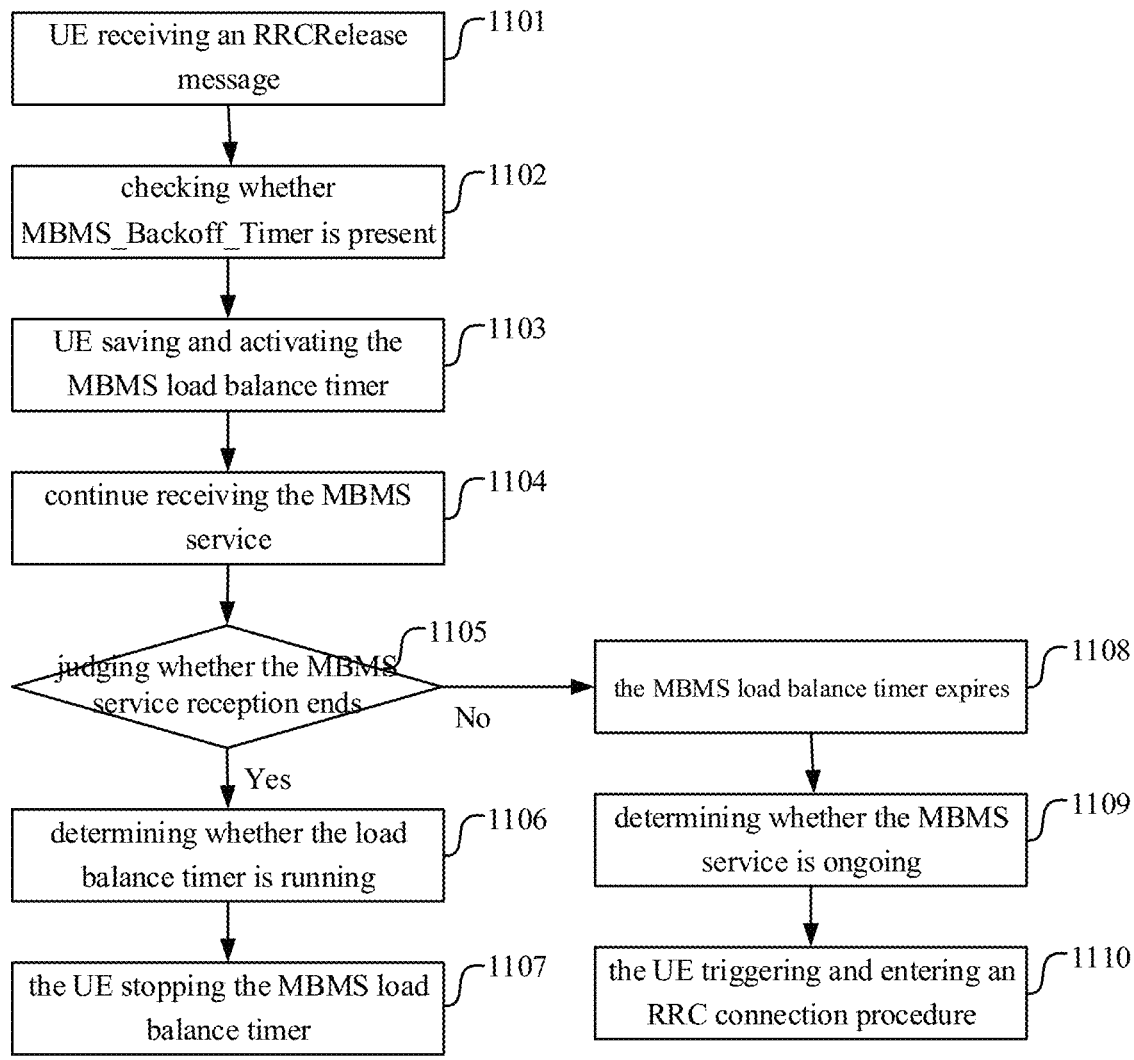
FIG. 11 is a flow chart of an implementation process of a terminal state processing method according to a third embodiment of the present disclosure.

FIG. 11 shows a flow chart of an implementation process of the terminal state processing method in the third embodiment. The network merely configures the information element load balance timer (e.g., MBMS_Backoff_Timer) in the RRCRelease message, to perform the load balance on the UEs. As shown in FIG. 11, when the description is mainly from the terminal side, the method includes the following steps 1101 to 1110.

Step 1101: the UE receiving an RRCRelease message.

In an implementation, the network side device includes the MBMS_Backoff_Timer in the RRCRelease message.

Step 1102: the UE checking whether the information element MBMS_Backoff_Timer is present.

To be specific, the UE checks whether the information element MBMS_Backoff_Timer is present, and if the MBMS_Backoff_Timer is present, save it.

Step 1103: the UE saving and activating the MBMS load balance timer.

Step 1104: the UE returning to the specified state to continue receiving the corresponding MBMS service.

To be specific, the UE returns to the specified state to continue receiving the corresponding MBMS service and activates the MBMS load balance timer, and the duration of the timer is set to be the MBMS_Backoff_Timer.

Step 1105: judging whether the MBMS service reception ends, if yes, Step 1106 is performed, otherwise, Step 1108 is performed.

Step 1106: determining whether the load balance timer is running.

Step 1107: the UE stopping the MBMS load balance timer.

Step 1108: determining whether the MBMS load balance timer expires.

Step 1109: determining whether the MBMS service reception is ongoing.

Step 1110: the UE triggering and entering an RRC connection procedure.

To be specific, if the UE ends the MBMS service while the MBMS load balance timer is still running, the MBMS load balance timer is stopped; and if the MBMS timer expires and the MBMS service is still ongoing, the UE triggers a process to enter the RRC_CONNECTED state.

Based on the same inventive concept, the present disclosure further provides in some embodiments a base station, a terminal, a terminal state processing apparatus and a computer-readable storage medium, the principle of the devices for solving the problem is similar to that of the terminal state processing method in each embodiment of the present disclosure, so for the implementations of the devices, references may be made to the implementations of the method, and thus will not be particularly defined herein.

The technical schemes in the embodiments of the present disclosure may be implemented as follows.

Figure 12:
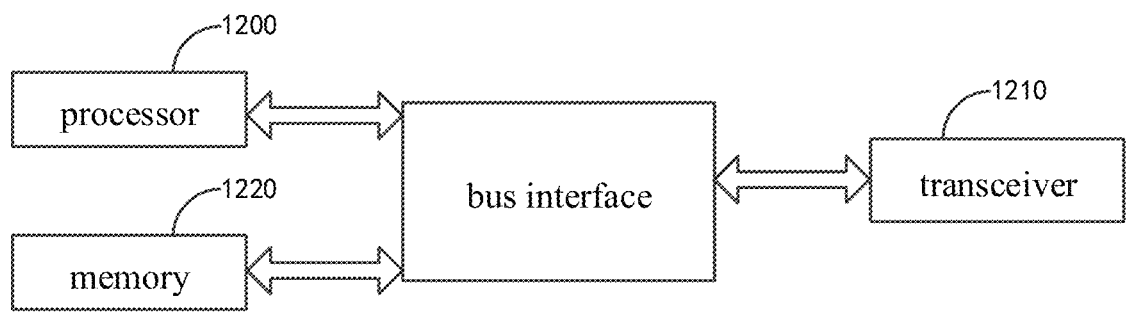
FIG. 12 a schematic structural view showing a base station according to an embodiment of the present disclosure.

FIG. 12 a schematic structural view showing a base station. As shown in FIG. 12, the base station includes: a processor 1200, configured to read a program in a memory 1220 and execute the following processes: indicating that a terminal receiving the MBMS service is to enter a specified RRC state in the case that a network is overloaded due to an excessive quantity of terminals receiving the MBMS service in an RRC_CONNECTED state; and/or indicating a time duration for a terminal to receive the MBMS service in the specified RRC state in the case that the network is overloaded due to the excessive quantity of terminals receiving the MBMS service in the RRC_CONNECTED state; and a transceiver 1210, configured to receive and transmit data under the control of the processor 1200.

In an implementation, the base station merely indicates that the terminal receiving the MBMS service is to enter the specified RRC state, to cause the terminal to enter the specified RRC state; or the base station indicates that the terminal receiving the MBMS service is to enter the specified RRC state and indicates the time duration for the terminal to receive the MBMS service in the specified RRC state, to cause the terminal to enter the specified RRC state and receive the MBMS service in the specified RRC state during the indicated time duration; or the base station merely indicates the time duration for the terminal to receive the MBMS service in the specified RRC state, to cause the terminal to enter the specified RRC state and receive the MBMS service in the specified RRC state during the indicated time duration.

In an implementation, indication is effected through an RRCRelease message.

In an implementation, the indication is effected by adding an information element to the RRCRelease message.

As shown in FIG. 12, a bus architecture may include any number of interconnected buses and bridges. Specifically, the bus architecture connects various circuits such as one or more processors represented by the processor 1200, and memories represented by the memory 1220. Other various circuits such as peripheral devices, voltage regulators, and power management circuits may also be connected by the bus architecture, which are well known in the art and thus will not be particularly defined herein. An interface is provided by a bus interface. The transceiver 1210 may be a plurality of elements, including a transmitter and a receiver, and provides a unit for communicating with other devices on a transmission medium. The processor 1200 is responsible for managing the bus architecture as well as general processing. The memory 1220 may store therein data for the operation of the processor 1200.

The present disclosure further provides in an embodiment a terminal state processing apparatus, including: an indication module, configured to indicate that a terminal receiving the MBMS service is to enter a specified RRC state in the case that a network is overloaded due to an excessive quantity of terminals receiving the MBMS service in an RRC_CONNECTED state; and/or indicate a time duration for a terminal to receive the MBMS service in the specified RRC state in the case that the network is overloaded due to the excessive quantity of terminals receiving the MBMS service in the RRC_CONNECTED state.

For the convenience of description, various parts of the above device are divided in terms of function into various modules or units and are described separately. Of course, the functions of each module or unit may be implemented in one or more pieces of software or hardware in implementing the present disclosure.

For the specific implementation, references may be made to the implementation of the terminal state processing method for the network side.

Figure 13:
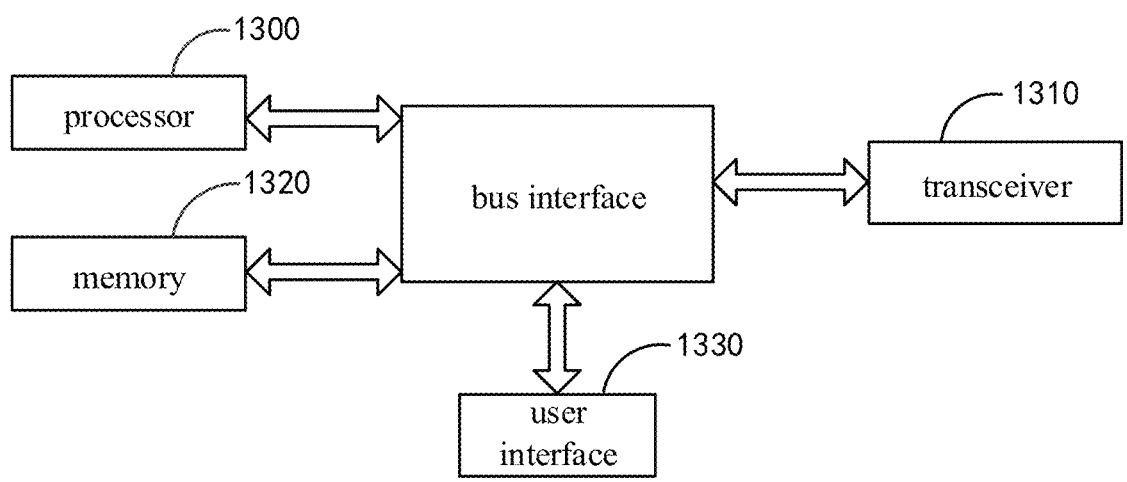
FIG. 13 a schematic structural view showing a UE according to an embodiment of the present disclosure.

FIG. 13 is a schematic structural view showing a UE. As shown in FIG. 13, the UE includes: a processor 1300, configured to read a program in a memory 1320 and execute the following process: receiving, by a terminal receiving an MBMS service, an indication sent by a network side device that the terminal is to enter a specified RRC state, and/or receiving, by the terminal receiving the MBMS service, an indication, sent by the network side device, of a time duration for the terminal to receive the MBMS service in the specified RRC state, wherein the indications are transmitted by the network side device in a case that a network is overloaded due to an excessive quantity of terminals receiving the MBMS service in an RRC_CONNECTED state; and entering the specified RRC state in accordance with the indication, and/or receiving the MBMS service in the specified RRC state during the indicated time duration; and a transceiver 1310, configured to receive and transmit data under the control of the processor 1300.

In an implementation, the terminal merely enters the specified RRC state in the case that only the indication that the terminal is to enter the specified RRC state is received by the terminal; or the terminal enters the specified RRC state and receives the MBMS service in the specified RRC state during the indicated time duration, in a case that the indication that the terminal is to enter the specified RRC state and the indication of the time duration for the terminal to receive the MBMS service in the specified RRC state are received by the terminal; or the terminals enter the specified RRC state and receive the MBMS in the specified RRC state during the indicated time duration in a case that only the indication of the time duration for the terminal to receive the MBMS service in the specified RRC state is received by the terminal.

In an implementation, the terminal further includes: stopping timing, by the terminal, in a case that a time duration during which the terminal enters the specified RRC state is within the indicated time duration when the MBMS service ends; or triggering, by the terminal, a process to enter the RRC_CONNECTED state in a case that the MBMS service does not end when the time duration during which the terminal enters the specified RRC state reaches the indicated time duration.

In an implementation, indication received by the terminal is indicated by the network side device through an RRCRelease message.

In an implementation, the indication received by the terminal is indicated by the network side device by adding an information element to the RRCRelease message.

As shown in FIG. 13, a bus architecture may include any number of interconnected buses and bridges. Specifically, the bus architecture connects various circuits such as one or more processors represented by the processor 1300, and memories represented by the memory 1320. Other various circuits such as peripheral devices, voltage regulators, and power management circuits may also be connected by the bus architecture, which are well known in the art and thus will not be particularly defined herein. An interface is provided by a bus interface. The transceiver 1310 may be a plurality of elements including a transmitter and a receiver, and provides a unit for communicating with other devices on a transmission medium. With respect to different UEs, a user interface 1330 may also be an interface capable of connecting, externally or internally, to a required device, and the connected device may include, but not limited to: a keypad, a display, a speaker, a microphone, a joystick, and the like.

The processor 1300 is responsible for managing the bus architecture as well as general processing. The memory 1320 may store therein data for the operation of the processor 1300.

The present disclosure further provides in an embodiment a terminal state processing apparatus, including: a receiving module, configured to receive an indication sent by a network side device that a terminal receiving an MBMS service is to enter a specified RRC state, and/or receive an indication, sent by the network side device, of a time duration for the terminal to receive the MBMS service in the specified RRC state, wherein the indications are transmitted by the network side device in a case that a network is overloaded due to an excessive quantity of terminals receiving the MBMS service in an RRC_CONNECTED state; and a processing module, configured to enter the specified RRC state in accordance with the indication, and/or receive the MBMS service in the specified RRC state during the indicated time duration.

For the convenience of description, various parts of the above device are divided in terms of function into various modules or units and are described separately. Of course, the functions of each module or unit may be implemented in one or more pieces of software or hardware in implementing the present disclosure.

For specific implementation, references may be made to the implementation of the terminal state processing method for the terminal side.

The present disclosure further provides in an embodiment a computer-readable storage medium storing therein a computer program for executing the above-mentioned terminal state processing methods.

For specific implementation, references may be made to the implementation of the terminal state processing method for the network side and/or the terminal side.

In summary, according to the technical schemes in the embodiments of the present disclosure, the information element (MBMS load balance indication and/or the MBMS load balance timer) is added in the RRCRelease message. The present disclosure further provides processing schemes related to the added information element for the network side and the terminal side.

For the terminal side: the function of processing the MBMS load balance indication and/or the MBMS load balance timer included in the RRCRelease message is introduced, so as to enable the terminal side to switch to the specified state to continue receiving the MBMS service and return to the RRC_CONNECTED state to continue receiving the MBMS service after the load balance timer configured by the network expires or the network again indicates through a message that the UE is to enter the connected state.

For the network side: the function of MBMS service load balancing in the RRC_CONNECTED state is introduced, some UEs may be instructed to assume other specified states.

To be specific, an indication that the UE receiving the MBMS service is to switch to the specified RRC state (the RRC_IDLE state or the RRC_INACTIVE state) is added in the RRCRelease message. At the same time, a time duration for the UE to receive the MBMS in the specified RRC state may be indicated. Optionally, it can be explicitly indicated through a message that the UE of specific MBMS service is to enter the RRC_CONNECTED state to continue receiving the MBMS service.

It is thus clear that, in the related art, the network side may not control the UE receiving the MBMS service in the RRC_CONNECTED state to temporarily receive the MBMS in the specified RRC state in the case that the network side is overloaded. According to the embodiments of the present disclosure, in the case that the network is overloaded due to an excessive quantity of terminals receiving the MBMS service in the RRC_CONNECTED state, the network side may flexibly control the UE receiving the MBMS to temporarily switch to the specified RRC state (the RRC_IDLE state or the RRC_INACTIVE state), and return to the RRC_CONNECTED state at a specific time in accordance with the configuration of the network, so as to reduce the quantity of MBMS UEs in the connected state when the network is overloaded, thereby realizing the load balance.

For a person skilled in the art, the embodiments of the present disclosure may be provided as methods, systems, or computer program products. Accordingly, the present disclosure may take the form of an entirely hardware embodiment, an entirely software embodiment or an embodiment combining software and hardware. The present disclosure may take the form of a computer program product implemented on one or more computer-usable storage media (including, but not limited to, magnetic disk storage, or optical storage) including computer-usable program code.

The present disclosure is described with reference to flow chart illustrations and/or block diagrams of methods, apparatus (systems), and computer program products in accordance with the embodiments of the present disclosure. It should be understood that, each flow and/or block of the flow chart illustrations and/or block diagrams, and combinations of flows and/or blocks in the flow chart illustrations and/or block diagrams, may be implemented by computer program instruction. The computer program instruction may be provided to a processor of a general purpose computer, a special purpose computer, an embedded processor, or other programmable data processing apparatus to produce a machine, such that the instruction executed by the processor of the computer or other programmable data processing apparatus, create means for implementing the functions specified in one or more processes of the flow chart and/or in one or more processes of the block diagram.

The computer program instruction may also be stored in a computer-readable storage that can direct a computer or other programmable data processing apparatus to function in a particular manner, such that the instruction stored in the computer-readable storage produce an article of manufacture including instruction devices, the instruction devices implement the functions specified in one or more processes of the flow chart and/or in one or more processes of the block diagram.

The computer program instruction may also be loaded onto a computer or other programmable data processing apparatus to cause a series of operational steps to be performed on the computer or other programmable apparatus to produce a computer implemented process, such that the instruction executed on the computer or other programmable apparatus provide steps for implementing the functions specified in one or more processes of the flow chart and/or in one or more processes of the block diagram.

It should be appreciated that, the embodiments of the present disclosure may be implemented by hardware, software, firmware, middleware, microcode, or a combination thereof. For hardware implementation, a unit, module, sub-unit and sub-module may be implemented in one or more application specific integrated circuits (ASICs), a digital signal processor (DSP), a DSP device (DSPD), a programmable logic device (PLD), a field-programmable gate array (FPGA), a general-purpose processor, a controller, a micro-controller, a microprocessor, other electronic unit configured to perform the functions in the present disclosure or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

Obviously, a person skilled in the art may make further modifications and improvements without departing from the spirit and scope of the present disclosure. In this way, these modifications and improvements are also intended to be encompassed by the disclosure if they fall within the scope of the claims of the present disclosure and equivalents thereof

What is claimed is:

1. A terminal state processing method for a network side device, comprising:
   indicating, by the network side device, a time duration for a terminal to receive a multimedia broadcast/multicast service (MBMS) service in a specified radio resource control (RRC) state, in a case that a network is overloaded due to an excessive quantity of terminals receiving the MBMS service in an RRC_CONNECTED state;
   wherein the network side device merely indicates the time duration for the terminal to receive the MBMS service in the specified RRC state, to cause the terminal to enter the specified RRC state and receive the MBMS service in the specified RRC state during the indicated time duration.

2. The terminal state processing method according to claim 1, wherein the network side device provides the indication through an RRCRelease message.

3. The terminal state processing method according to claim 2, wherein the network side device provides the indication by adding an information element to the RRCRelease message.

4. A non-transitory computer-readable storage medium storing therein a computer program, wherein the computer program is configured to be executed by a processor, to implement the method according to claim 1.

5. A base station, comprising:
   a processor, configured to read a program in a memory to execute steps of the method according to claim 1.

6. The base station according to claim 5, wherein the base station provides the indication through an RRCRelease message.

7. The base station according to claim 6, wherein the base station provides the indication by adding an information element to the RRCRelease message.

8. A terminal state processing method for a terminal, comprising:
   receiving, by the terminal receiving an MBMS service, an indication, sent by a network side device, of a time duration for the terminal to receive the MBMS service in a specified RRC state, wherein the indications is transmitted by the network side device in a case that a network is overloaded due to an excessive quantity of terminals receiving the MBMS service in an RRC_CONNECTED state; and
   entering, by the terminal, the specified RRC state in accordance with the indication, and/or receiving, by the terminal, the MBMS service in the specified RRC state during the indicated time duration;
   wherein the terminal enters the specified RRC state and receives the MBMS service in the specified RRC state during the indicated time duration, in a case that only the indication of the time duration for the terminal to receive the MBMS service in the specified RRC state is received by the terminal.

9. The terminal state processing method according to claim 8, further comprising:
   stopping timing, by the terminal, in a case that a time duration during which the terminal enters the specified RRC state is within the indicated time duration when the MBMS service ends; or
   triggering, by the terminal, a process to enter the RRC_CONNECTED state, in a case that the MBMS service does not end when the time duration during which the terminal enters the specified RRC state reaches the indicated time duration.

10. The terminal state processing method according to claim 8, wherein the indication received by the terminal is indicated by the network side device through an RRCRelease message.

11. The terminal state processing method according to claim 10, wherein the indication received by the terminal is indicated by the network side device by adding an information element to the RRCRelease message.

12. A non-transitory computer-readable storage medium storing therein a computer program, wherein the computer program is configured to be executed by a processor, to implement the method according to claim 8.

13. A terminal, comprising:
   a processor, configured to read a program in a memory and execute the following process:
   receiving, by the terminal receiving an MBMS service, an indication, sent by a network side device, of a time duration for the terminal to receive the MBMS service in a specified RRC state, wherein the indications is transmitted by the network side device in a case that a network is overloaded due to an excessive quantity of terminals receiving the MBMS service in an RRC_CONNECTED state; and entering the specified RRC state in accordance with the indication, and/or receiving the MBMS service in the specified RRC state during the indicated time duration;

wherein the terminal enters the specified RRC state and receives the MBMS service in the specified RRC state during the indicated time duration, in a case that only the indication of the time duration for the terminal to receive the MBMS service in the specified RRC state is received by the terminal; and a transceiver, configured to receive and transmit data under control of the processor.

14. The terminal according to claim 13, further comprising:
stopping timing, by the terminal, in a case that a time duration during which the terminal enters the specified RRC state is within the indicated time duration when the MBMS service ends; or
triggering, by the terminal, a process to enter the RRC_CONNECTED state, in a case that the MBMS service does not end when the time duration during which the terminal enters the specified RRC state reaches the indicated time duration.

15. The terminal according to claim 13, wherein the indication received by the terminal is indicated by the network side device through an RRCRelease message.

16. The terminal according to claim 15, wherein the indication received by the terminal is indicated by the network side device by adding an information element to the RRCRelease message.

* * * * *